3,347,223
PNEUMOGRAPH
Allan F. Pacela, Woodland Hills, Calif., assignor to Universal Match Corporation, St. Louis, Mo., a corporation of Delaware
Filed Jan. 8, 1964, Ser. No. 336,558
13 Claims. (Cl. 128—2.1)

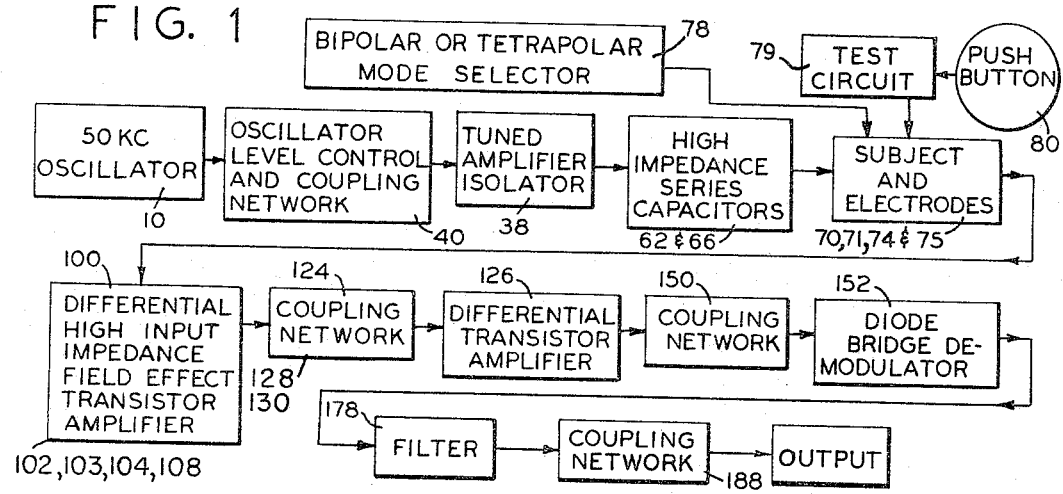
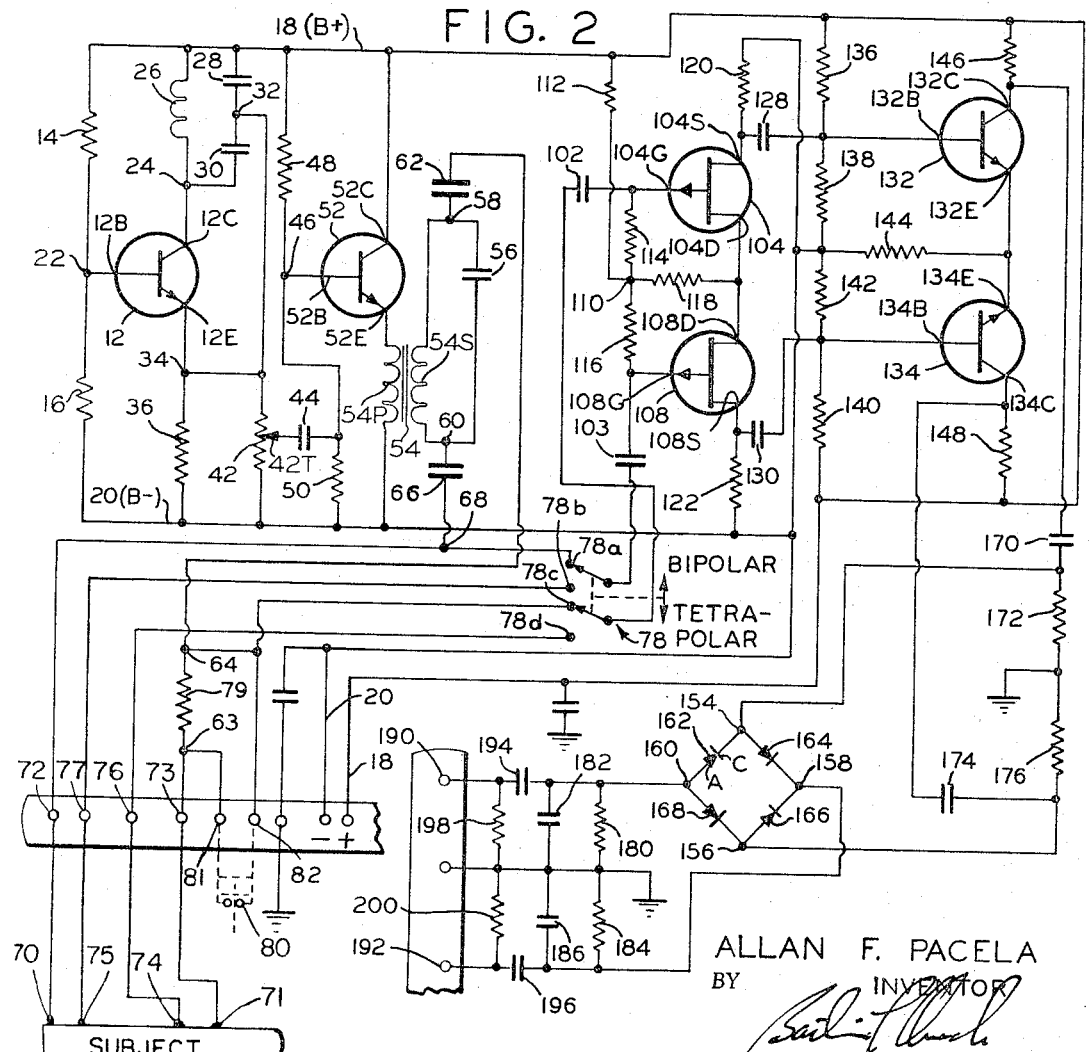

This invention relates to measurement systems and particularly to an electronic system for the measurement of the respiration of a human or other animal. Such a device may be denominated a pneumograph.

Conventional impedance pneumographs have been designed according to at least five circuit approaches, viz:
(1) Bridge with amplitude detector system;
(2) Bridge with phase detector system;
(3) Modulated oscillator system;
(4) Reactance measuring system; and
(5) Constant current carrier system.

Although the measurement techniques vary in each instrument or system, the fundamental quantity being measured or monitored is electrical impedance. Two or more electrodes, e.g., well, cup, screen, or foil type, are placed on the chest of the subject animal. Electrode jelly or paste may be used. Each system provides an output signal which is variable in response to change in the impedance between the electrodes. Within the limitations of each system, the output signal is related to the instantaneous volume of respiration of the subject animal.

Consider the bridge with amplitude detector system. The balance point of an oscillator powered bridge determines the total electrode to electrode impedance and gives an indication of the quality of the electrode contact with the subject. Any change in the impedance of the subject, denominated $\Delta Z$, unbalances the bridge and provides a signal which is recovered by a demodulator. This bridge system is simple, but suffers from four disadvantages: First, the bridge must be manually balanced, and this balance must be accomplished for both resistance and reactance. Second, the bridge unbalance signal is intrinsically non-linear. This non-linearity obscures the relationship between the system output signal and the respiration of the subject. Third, if due to a change in the quality of the electrode contacts the total impedance between the electrodes drifts over a period of time, the bridge must be rebalanced. Fourth, in order to avoid erroneous output signals due to drift, the bridge must be set slightly out of balance, which increases the non-linearity of the system.

The bridge with phase detector system is a distinct improvement over the amplitude detector system. The use of a phase detector requires only a manual balancing for resistance of an oscillator powered bridge. The second, third and fourth previously mentioned disadvantages remain.

In the modulated oscillator system the subject is coupled to an oscillator by means of a special network designed so that the impedance change, $\Delta Z$, of the subject will provide amplitude or frequency modulation of the oscillator output signal. A demodulator is used to recover the $\Delta Z$ information. This system suffers from at least two disadvantages: First, any change in the total impedance between the electrodes requires a readjustment of the coupling network. Second, the relationship between $\Delta Z$ and the system output signal is not linear, and this relationship depends on the total impedance between the electrodes.

Reactance measuring systems may be constructed utilizing bridges, modulated oscillators, or constant current sources. Such systems separate the $\Delta Z$ signal into its real and imaginary, i.e., resistive and reactive, components. The value of such information has not been established, as it is known that the respiration information is not found primarily in either the resistive or the reactive components of $\Delta Z$, but is found in both jointly.

In the constant current carrier system a small alternating carrier current, with a peak-to-peak amplitude on the order of one milliampere, is applied to the subject animal. The carrier current amplitude does not substantially change, regardless of the value of the impedance between the electrodes. The frequency of the current is set in the 10 kc. to 200 kc. range, with 40 kc. and 50 kc. being customary. Since the current through the subject is held constant, by Ohm's law, the absolute magnitude of the voltage between the electrodes is directly proportional to the absolute value of the impedance between the electrodes. Thus, the voltage drop across the impedance produced by the carrier current is amplitude modulated by changes in the absolute value of the impedance between the electrodes. A demodulator recovers the impedance change, i.e., the respiration signal, from the carrier.

The conventional constant current carrier system is superior to the previously described sytems; however, it does suffer from a number of disadvantages.

A conventional constant current carrier system pneumograph is not capable of operating into a wide range of electrode to electrode impedance values. This fault limits the types of electrodes that may be used, limits the periods of time that the electrodes may remain on the subject animal, and affects the relationship of the output signal to the changes in the impedance, $\Delta Z$.

A conventional constant current carrier system pneumograph is not capable of parallel use with an electrocardiograph. That is, an electrocardiograph and a conventional C.C.C.S. pneumograph may not be operated from the same pair or plurality of electrodes.

A conventional C.C.C.S. pneumograph has poor carrier current frequency stability. This causes nondesired frequency modulation of the carrier. Also, since the total impedance between the electrodes and the change in impedance, $\Delta Z$, are dependent on the frequency of the carrier current applied to the electrodes, any shift in the carrier current frequency will affect the output signal and obscure the relationship between the output signal and the respiration of the subject animal.

A conventional C.C.C.S. pneumograph is large and not adapted to miniature construction for use in aerospace telemetry applications.

It is an object of this invention to provide a constant current carrier system impedance pneumograph which is capable of detecting changes in the impedance of a subject animal due to respiration, and which is not significantly affected by artifacts.

It is another object of this invention to provide a constant current carrier system impedance pneumograph which is capable of operating into a wide range of electrode-to-electrode impedance values.

It is yet another object to provide a C.C.C.S. pneumograph which is capable of parallel use with an electrocardiograph.

It is still another object to provide a C.C.C.S pneumograph which is capable of simultaneous use with other electronic measuring, monitoring or stimulating systems.

It is yet another object to provide a C.C.C.S. pneumograph which has good carrier current frequency stability.

It is, moreover, another object to provide a miniaturized C.C.C.S. pneumograph.

A feature of this invention is the provision of a miniature, all transistor apparatus for measuring minute, regular, changes in the electrical impedance of the chest of a subject animal disposed between two or four contacting electrodes, which comprises an A.C. constant current source, neither output terminal of which is grounded, having higher impedance at low frequencies than high, the output current being below the level of tissue response thereto, coupled to one pair of said electrodes; a differential amplifier for amplifying the alternating voltage developed between the current source electrodes or an additional pair of electrodes, said amplifier having an input impedance high compared to the impedance of the subject animal's chest; and means for measuring the changes of the amplified alternating voltage to obtain a measure of the minute regular changes in the electrical impedance of the chest of said subject animal.

These and other objects and features of this invention will become more apparent by reference to the following description taken in conjunction with the accompanying drawings, in which:

FIGURE 1 is a block diagram of an embodiment of this invention; and

FIGURE 2 is an electrical schematic diagram of the embodiment shown in FIGURE 1.

Turning to the figures, a 50 kc. Colpitts type oscillator 10 is provided by a NPN type transistor 12 and its associated components. A resistor 14 and a resistor 16 are connected in series between the B+ line 18 and the B− line 20 to form a voltage divider. The base electrode 12B of the transistor 12 is connected to the midjunction 22 of the divider. The collector electrode 12C is connected at a junction 24 to one end of an RF choke, 26, the other end of which is connected to B+. A capacitor 28 and a capacitor 30 are also connected in series as a divider between the collector electrode 12C and B+. The midjunction 32 of the capacitor divider is connected at a junction 34 to the emitter electrode 12E, and a resistor 36 is connected between the junction 34 and B−.

The oscillator 10 is coupled to a tuned amplifier isolator 38 by a level control and coupling network 40. The network 40 includes a potentiometer resistor 42 which is connected between the junction 34 and B−. The tap 42T of the potentiometer is connected to one end of a coupling capacitor 44, the other end of which is connected to the midjunction of a voltage divider provided by a resistor 48 and a resistor 50 connected in series between B+ and B−. The divider midjunction 46 is also connected to the base electrode 52B of a NPN type transistor 52. The collector electrode 52C is connected to B+. The emitter electrode 52E is connected to one end of the primary winding 54P of a R.F. transformer 54. The other end of the primary winding is connected to B−. A tuning capacitor 56 is connected, at junctions 58 and 60 respectively, to the two ends of the secondary winding 54S. The transistor 52, the transformer 54 and capacitor 56 comprise an isolation amplifier which is tuned to 50 kc./sec.

A high impedance capacitor 62 is connected between the junction 58 and a junction 64, and a high impedance capacitor 66 is connected between the junction 60 and a junction 68. These capacitors, in conjunction with the tuned amplifier isolator, provide a constant current source for the system.

A first pair of electrodes 70 and 71 are respectively connected at one of their ends to a pair of terminals 72 and 73. A second pair of electrodes 74 and 75 are respectively connected at one of their ends to a pair of terminals 76 and 77. The other ends of the electrodes are connected to the subject animal.

The pneumograph is adapted for operation alternatively in a bipolar or a tetrapolar made by a mode selector 78. When in the bipolar mode, the first pair of electrodes 70 and 71 are used to pass a current through the subject animal. When in the tetrapolar mode, the first pair of electrodes 70 and 71 is used to pass a current through the subject animal, while the second pair of electrodes 74 and 75 is used to measure the impedance change. The mode selector 78 is a two-pole two-position switch, shown in FIGURE 2 in the bipolar mode position. The terminal 72 is connected to the junction 68, which is also connected to a contact 78a. The terminal 73 is connected at a junction 63 to one end of a test resistor 79, the other end of which is connected to the junction 64, which is also connected to a contact 78c. The resistor 79 is normally short circuited by a pushbutton switch 80, which is connected, via a pair of terminals 81 and 82, across the resistor 79. (For calibration of ΔZ, the switch 80 is opened, thereby passing a known change in resistance, equal to the resistance of the resistor 79, in series with the current source. This may be done with the subject animal in the circuit or with a resistance which is external to the pneumograph, substituted for the subject animal. This calibration may only be performed in the bipolar mode.)

The terminal 76 is connected to a contact 78d, and the terminal 77 is connected to a contact 78b.

A differential, high input impedance, field effect transistor amplifier 100 having a pair of input capacitors 102 and 103 is coupled across the variable impedance of the subject animal by the mode selector 78. When the mode selector is in the bipolar position the input capacitor 103 is coupled through the contact 78a, the junction 68, and the terminal 72 to the electrode 70, and the input capacitor 102 is coupled through the contact 78c, the junction 64, the resistor 79, the junction 63, and the terminal 73 to the electrode 71. When the mode selector is in the tetrapolar position the input capacitor 102 is coupled through the contact 78d, and the terminal 76, to the electrode 74; the input capacitor 103 is coupled through the contact 78b, and the terminal 77 to the electrode 75.

The capacitor 102 is coupled to the gate electrode 104G of a first field effect transistor 104. The capacitor 103 is coupled to the gate electrode 108G of a second field effect transistor 108. A junction 110 is connected to one end of a resistor 112, the other end of which is connected to B+. The junction 110 is further connected to one end of a resistor 114, the other end of which is connected to the gate electrode 104G, and to one end of a resistor 116, the other end of which is connected to the gate electrode 108G. The junction 110 is also connected to one end of a resistor 118, the other end of which is connected to both the drain electrode 104D of the transistor 104 and the drain electrode 108D of the transistor 108. A resistor 120 couples the source electrode 104S of the transistor 104 to B−, and a resistor 122 couples the source electrode 108S to B−.

A coupling network 124 couples the output of the differential, high input impedance, field effect, transistor amplifier 100 to a differential, transistor amplifier 126. A capacitor 128 couples the source electrode 104S of the field effect transistor 104 to the base electrode 132B of a second NPN transistor 132. A capacitor 130 couples the electrode 108S of the transistor 108 to the base electrode 134B of a second NPN transistor 134. The base electrode 132B is connected to one end of a resistor 136, the other end of which is connected to B+, and also connected to one end of a resistor 138, the other end of which is connected to B−. The base electrode 134B is connected to one end of a resistor 140, the other end of which is connected to B+, and also is connected to one end of a resistor 142, the other end of which is connected to B−. The emitter electrodes 132E and 134E of the transistors 132 and 134 respectively, are connected to one end of a resistor 144, the other end of which is connected to B−. The collector electrode 132C is connected to one end of resistor 146, the other end of which is connected to B+. The collector electrode 134C is connected to one end of resistor 148, the other end of which is connected to B+.

A coupling network 150 couples the output of the differential, transistor amplifier 126 to a diode bridge demodulator 152. The bridge has two input junctions 154 and 156, two output junctions 158 and 160, and four diodes 162, 164, 166 and 168. The cathode 162C of the diode 162 is connected to the junction 154, and the anode 162A is connected to the junction 160. The cathode 164C of the diode 164 is connected to the junction 158, and the anode 164A is connected to the junction 154. The cathode 166C of the diode 166 is connected to the junction 158 and the anode 166A is connected to the junction 156. The cathode 168C of the diode 168 is connected to the junction 156 and the anode 168A is connected to the junction 160. A capacitor 170 couples the collector electrode 132C of the transistor 132 to the bridge input junction 154. A resistor 172 is connected between the junction 154 and ground. A capacitor 174 couples the collector electrode 134C of the transistor 134 to the bridge input junction 156. A resistor 176 is connected between the junction 156 and ground.

A filter 178 is connected across the output junctions of the diode bridge demodulator 152. The output junction 160 is connected to one end of a resistor 180 and also to one end of a capacitor 182, the other ends of which are connected to ground. The output junction 158 is connected to one end of a resistor 184 and also to one end of a capacitor 186, the other ends of which are connected to ground. This filter also serves as a load for the bridge demodulator 152.

A coupling network 188 is connected across the output of the filter 178, to couple the system to the output terminals 190 and 192. A capacitor 194 is connected between the junction 160 and the terminal 190. A capacitor 196 is connected between the junction 158 and the terminal 192. A resistor 198 is connected between the terminal 190 and ground, and a resistor 200 is connected between the terminal 192 and ground.

Exemplary values for the above described components follow:

| | |
|---|---|
| 12—2N169A | 122—47 kilohms |
| 14—180 kilohms | 128—1500 picofarads |
| 16—4700 ohms | 130—1500 picofarads |
| 18—(B+)+10 volts | 132—2N169A |
| 20—(B−)−10 volts | 134—2N169A |
| 26—6.8 microhenrys | 136—1 megohm |
| 28—3910 picofarads | 138—220 kilohms |
| 30—2700 picofarads | 140—1 megohm |
| 36—22 kilohms | 142—220 kilohms |
| 42—10 kilohms | 144—10 kilohms |
| 44—6800 picofarads | 146—66 kilohms |
| 48—180 kilohms | 148—66 kilohms |
| 50—33 kilohms | 162—1N67A |
| 52—2N169A | 164—1N67A |
| 54—"Triad" SP-66 | 166—1N67A |
| 56—220 picofarads | 167—1N67A |
| 62—110 picofarads | 170—1500 picofarads |
| 66—110 picofarads | 172—560 kilohms |
| 79—1 ohm | 174—1500 picofarads |
| 102—0.05 microfarad | 176—560 kilohms |
| 103—0.05 microfarad | 180—220 kilohms |
| 104—2N2606 | 182—0.2 microfarad |
| 108—2N2606 | 184—220 kilohms |
| 112—47 kilohms | 186—0.2 microfarad |
| 114—22 megohms | 194—22 microfarads |
| 116—22 megohms | 196—22 microfarads |
| 118—2200 ohms | 198—100 kilohms |
| 120—47 kilohms | 200—100 kilohms |

The transistor 12 and its associated circuit constitute a 50 kc./sec. Colpitts type oscillator. The output voltage of this oscillator is coupled through the capacitor 44 and the oscillator level control 42 to the transistor 52. The transistor 52, the transformer 54 and the tuning capacitor 56 constitute a tuned isolation amplifier which insures good constant current frequency stability. For electrode-to-electrode impedance values from zero to infinity, the frequency stability in a prototype is plus or minus .02%. The resistors 48 and 50 form a conventional biasing network. Although this circuit is an emitter follower type, the overall gain is greater than unity due to transformer secondary winding 54S being tuned for 50 kc./sec. The center tap of the secondary winding 54S is not connected to ground. A ground at this point would provide a ground loop with any grounds at the electrodes attached to the subject animal. The two capacitors 62 and 66 are inserted in series with the output of the transformer 54. The values of these capacitors are chosen such that the impedance seen looking towards the transformer 54 from the subject animal has a minimum value of 20 megohms at 100 cycles per second. At 50 kc./sec. this impedance drops to 60 kilohms, and in part determines the current source regulation as well as the voltage required at the secondary winding 54S.

The output voltage of the oscillator 10 at the emitter electrode 12E is approximately 15 volts peak-to-peak. The gain of the tuned amplifier isolator 38 is approximately two. Thus at 50 kc./sec. there is developed approximately 30 volts peak-to-peak at the secondary winding 54S. If the impedance across the electrodes 70 and 72 is less than 2.5 kilohms, a current of .5 milliamperes, peak-to-peak, will flow through the subject animal. The current will thus be constant within ±2.5% for electrode-to-electrode impedances of 0 to 2.5 kilohms. For the typical range of impedances for subject animals of 100 to 500 ohms the current will be constant with ±1.0%. The current source regulation for a typical respiration variation in impedence of 1 ohm will then be ±.001%. The loading effect of the input impedance of the differential, field effect, transistor amplifier 100 can be neglected, as it is greater than 20 megohms at both 50 kc./sec. and 100 cycles per second.

The output signal from the current source and the subject animal impedance is differential and, therefore, the following amplifier stage must be a differential amplifier. The differential amplifier 100 amplifies the difference between the voltage appearing at terminals 72 and 73 or 77 and 76 and provides a differential output signal to the coupling capacitors 128 and 130. The differential amplifier 126 amplifies this signal to provide a differential output signal to the input junctions of the diode bridge demodulator 152. The demodulator developes the amplitude modulation of the R.F. carrier across the resistors 180 and 184. This signal is filtered by the filter 178 and is provided as an output by the coupling network 188.

As discussed previously, this system is adopted for operation in either a bipolar or tetrapolar mode. There are two major advantages to operation in the tetrapolar mode.

The first advantage of the tetrapolar mode is that it decreases the sensitivity of the pneumograph to artifacts. Artifacts are unwanted or meaningless signals. For example, any movement of the electrodes with respect to the skin of the subject animal, or any movement of the skin itself, will appear as a signal, that is, as an impedance change ΔZ. Such signals have nothing to do with respiration, and are termed artifacts. The artifact is an impedance change which occurs at all four electrodes. For example, it may occur at the interfaces between the electrode and the skin. The artifact results in a relatively large voltage drop or voltage signal at the electrodes 70 and 71 which are coupled to the current source. However, there is very little artifact voltage signal developed at the electrodes 74 and 75 which are coupled to the amplifier, due to the high input impedance of the amplifier. Thus, very little artifact signal gets into the amplifier and the output of the pneumograph is relatively undisturbed by the artifact. In comparison, in the bipolar mode, any artifact signal occurring at the two electrodes to which both the current source and the amplifier are directly coupled, is directly fed to the amplifier, thus appearing significantly in the pneumograph output.

The second advantage of the tetrapolar mode is that the dynamic range required for the amplifier is smaller. This is particularly important in solid state pneumographs designed for space or flight operation. The impedance of the junction between the skin of the subject animal and each electrode increases with time, and becomes very large if the electrode jelly dries up. In the bipolar mode this causes an increase in the carrier voltage signal to the amplifier. This large carrier voltage could overdrive and thereby cut off the amplifier, resulting in the complete failure of the pneumograph. In the tetrapolar mode, due to the high input impedance of the amplifier and to the use of separate voltage sensing electrodes, the carrier voltage does not greatly increase at the amplifier input.

There are also several important advantages to the particular circuitry utilized, wherein the circuitry at the subject animal is symmetrical, floating, has a capacitor current source, and has an A.C. coupled amplifier. The pneumograph may be concurrently used with other equipments, such as an electrocardiograph (E.C.G.). The simultaneous use of the same electrodes for an E.C.G. and a pneumograph is particularly advantageous in space or flight applications where the total number of electrodes on the subject animal must be minimized. The E.C.G. may be connected directly across the current source electrodes 70 and 71 or the voltage amplifier electrodes 74 and 75. It is then important to have a high input impedance (i.e. greater than 20 megohmns) to the pneumograph at the low frequencies, e.g., 0–100 c.p.s., at which the ECG frequencies, or the E.C.G. signal will be distorted or attenuated. The capacitor current source output has a higher impedance at low frequencies than a resistor current source which would have an equal impedance at 50 k.c. It is also very important that there be no conflict of grounds between the several equipments concurrently utilizing the same electrodes. The instant pneumograph current source output and the amplifier input are symmetrical and floating with respect to ground. Thus, no conflict of grounds occurs at any point on the subject animal with any other ground required by other equipment. Finally, small D.C. or galvanic potentials may be found between different points on the subject animal. Typical values of these skin potentials range from 0 to 100 millivolts. The use of A.C. coupling provided by the capacitors 62, 66, 102 and 103 in the instant pneumograph blocks these D.C. skin potentials from the amplifier input. In sum, the instant invention provides a miniaturized pneumograph well adapted to accurately measure small (about 1%) regular changes in the tissue impedance of a subject animal by means of electrodes which may be concurrently utilized by other equipments.

The invention has thus been described, but it is desired to be understood that it is not confined to the particular forms or usages shown and described, the same being merely illustrative, and that the invention may be carried out in other ways without departing from the spirit of the invention and, therefore, the right is broadly claimed to employ all equivalent instrumentalities coming within the scope of the appendant claims, by means of which the objects of this invention are obtained and the new results are accomplished, as it is obvious that the particular embodiment herein shown and described is only one of the many that can be employed to obtain these objects and to accomplish these results.

What is claimed is:

1. An apparatus for measuring minute changes in the electrical impedance of the tissue of a subject animal, comprising:
   a first and a second pair of electrodes, each of said electrodes adapted to be in electrical contact with the tissue of the subject animal;
   an A.C. constant current source having a pair of output terminals, neither of said terminals being grounded;
   said source having an output impedance which is higher at low frequencies than at high frequencies;
   said pair of terminals of said source being coupled respectively to said first pair of electrodes;
   a differential amplifier for amplifying A.C. voltage having a pair of input terminals, neither of said terminals being grounded;
   said amplifier having an input impedance which is high compared to the impedance of the tissue of the subject animal;
   said pair of terminals of said amplifier being coupled respectively to said second pair of electrodes, and
   said amplifier having an output pair of terminals coupled to a means for measuring the changes of the amplifier output signal to obtain a measure of the minute changes in the electrical impedance of the tissue of the subject animal.

2. An apparatus according to claim 1 wherein:
   the current provided by said source is below the level of tissue response thereto.

3. An apparatus according to claim 1 wherein:
   said A.C. constant current source comprises a transistorized oscillator coupled to a tuned transistorized amplifier having a capacitor output stage.

4. An apparatus according to claim 1 wherein:
   said differential amplifier comprises a pair of field effect transistors intercoupled as a differential, high impedance input, amplifier having a capacitor input, and coupled to an additional pair of transistors intercoupled as a differential amplifier.

5. An apparatus according to claim 1 wherein:
   said means for measuring the changes of the amplifier output signal comprises a demodulator.

6. An apparatus according to claim 5 wherein:
   said demodulator comprises a diode bridge.

7. An apparatus according to claim 1 wherein:
   said A.C. constant current source provides current in the kilocycle per second frequency range.

8. An apparatus according to claim 1 wherein:
   each of said electrodes is adapted to be in electrical contact with the chest of the subject animal.

9. An apparatus for measuring minute changes in the electrical impedance of the tissue of a subject animal, comprising:
   a pair of electrodes, each of said electrodes adapted to be in electrical contact with the tissue of the subject animal;
   an A.C. constant current source having a pair of output terminals, neither of said terminals being grounded;
   said source having an output impedance which is higher at low frequencies than at high frequencies;
   said pair of terminals of said source being coupled respectively to said pair of electrodes;
   a differential amplifier for amplifying A.C. voltage having a pair of input terminals, neither of said terminals being grounded;
   said amplifier having an input impedance which is high compared to the impedance of the tissue of the subject animal;
   said input pair of terminals of said amplifier being coupled respectively to said pair of electrodes, and
   said amplifier having an output pair of terminals coupled to a means for measuring the changes of the amplifier output signal to obtain a measure of the minute changes in the electrical impedance of the tissue of the subject animal.

10. An apparatus according to claim 9 further including:
   an additional pair of electrodes, each of said electrodes adapted to be in electrical contact with the tissue of the subject animal; and
   a switch means interposed and connected between said first mentioned pair of electrodes and said input pair of terminals of said amplifier, and also connected to said second pair of electrodes, and adapted to alternatively connect said input terminals to one or the other pair of electrodes respectively.

11. An apparatus according to claim 9 wherein:
   the current provided by said source is below the level of tissue response thereto.

12. An apparatus according to claim 9 wherein:
said A.C. constant current source comprises a transistorized oscillator coupled to a tuned transistorized amplifier having a capacitor output stage.

13. An apparatus according to claim 1 wherein:
said differential amplifier comprises a pair of field effect transistors intercoupled as a differential, high impedance input, amplifier, having a capacitor input, and coupled to an additional pair of transistors intercoupled as a differential amplifier.

References Cited

UNITED STATES PATENTS

| Re. 22,258 | 1/1943 | Mittlemann | 128—413 X |
| 2,111,135 | 3/1938 | Bagno | 128—2.1 |
| 2,661,734 | 12/1953 | Holzer et al. | 128—2.1 |

FOREIGN PATENTS 566,752  4/1958  Belgium.

OTHER REFERENCES

"Pneumographic Monitoring Unit" by P. I. Hersberg in Am. J. of Med. Elec. for July–September 1963, pp. 207–211.

"The Impedance Pneumograph" by L. A. Geddes in Aerospace Medicine for 1962, pp. 28–33.

RICHARD A. GAUDET, *Primary Examiner.*

SIMON BRODER, *Examiner.*